United States Patent [19]

Wray et al.

[11] Patent Number: 4,676,744
[45] Date of Patent: Jun. 30, 1987

[54] REGENERATIVE HEATING APPARATUS

[75] Inventors: George Wray; Trevor Ward; James H. Goodfellow, all of West Yorkshire, England

[73] Assignee: British Gas plc, London, England

[21] Appl. No.: 770,282

[22] Filed: Aug. 28, 1985

Related U.S. Application Data

[63] Continuation of Ser. No. 588,712, Mar. 12, 1984, abandoned.

[30] Foreign Application Priority Data

Mar. 11, 1983 [GB] United Kingdom ............... 8306795

[51] Int. Cl.$^4$ ............................................. F27D 17/00
[52] U.S. Cl. .................................... 432/181; 431/170; 432/219
[58] Field of Search .................... 432/180, 181, 219; 431/164, 166, 170

[56] References Cited

U.S. PATENT DOCUMENTS

| Re. 29,622 | 5/1978 | Lange | 432/180 |
|---|---|---|---|
| 1,311,515 | 7/1919 | Hess | 431/181 |
| 2,137,892 | 11/1938 | Bradford | 432/181 |
| 2,638,895 | 5/1953 | Swindin | 431/158 |
| 3,367,384 | 2/1968 | Voorheis | 431/352 |
| 3,738,792 | 6/1973 | Chung Liao Feng | 431/158 |
| 3,955,914 | 5/1976 | Delew | 431/353 |
| 3,993,449 | 11/1976 | Childs | 431/353 |
| 4,063,872 | 12/1977 | Lambiris | 431/285 |
| 4,504,211 | 3/1985 | Beardmore | 431/3 |
| 4,522,588 | 6/1985 | Todd et al. | 431/181 |

FOREIGN PATENT DOCUMENTS

| 951236 | 7/1974 | Canada | 431/158 |
|---|---|---|---|
| 1151983 | 2/1958 | France | 431/188 |
| 1322656 | 7/1973 | United Kingdom | . |

Primary Examiner—Carroll B. Dority, Jr.
Attorney, Agent, or Firm—Larson and Taylor

[57] ABSTRACT

The regenerative heating apparatus (FIG. 1) comprises a pair of regenerators 51a and 51b arranged so that in use while one is being heated by waste gas, the other is preheating air for the combustion of fuel. A reversing valve 58 is connected to each lower end 91a and 91b of the regenerators 51a and 51b, the valve 58 connecting the regenerators 51a and 51b to an inlet 99 for receiving air and an outlet 100 for discharge of the waste gas. The reversing valve 58 is reversible to connect one regenerator to the inlet and the other regenerator to the outlet. Each regenerator incorporates at its upper end a burner (B1 and B2) with as shown in FIG. 2 a body having a passage 2 formed with openings 3 and 4. The opening 4 serves to receive air for combustion when its regenerator is preheating air or to discharge waste gas to the regenerator while the opening 3 serves to supply combusted fuel and air to the furnace 90 or to receive waste gas from the furnace 90. Each burner has an assembly 5 for injecting fuel and air into the passage 2 and the fuel and air first mix in a nozzle 31 with the fuel being ignited by an electrode 47. The fuel is combusted in a precombustion chamber 32 before entering the main combustion chamber 16. The fuel is partially or fully precombusted irrespective of the mode in which the burner is operating to avoid prepurging with or re-ignition between regenerator operating cycles.

3 Claims, 2 Drawing Figures

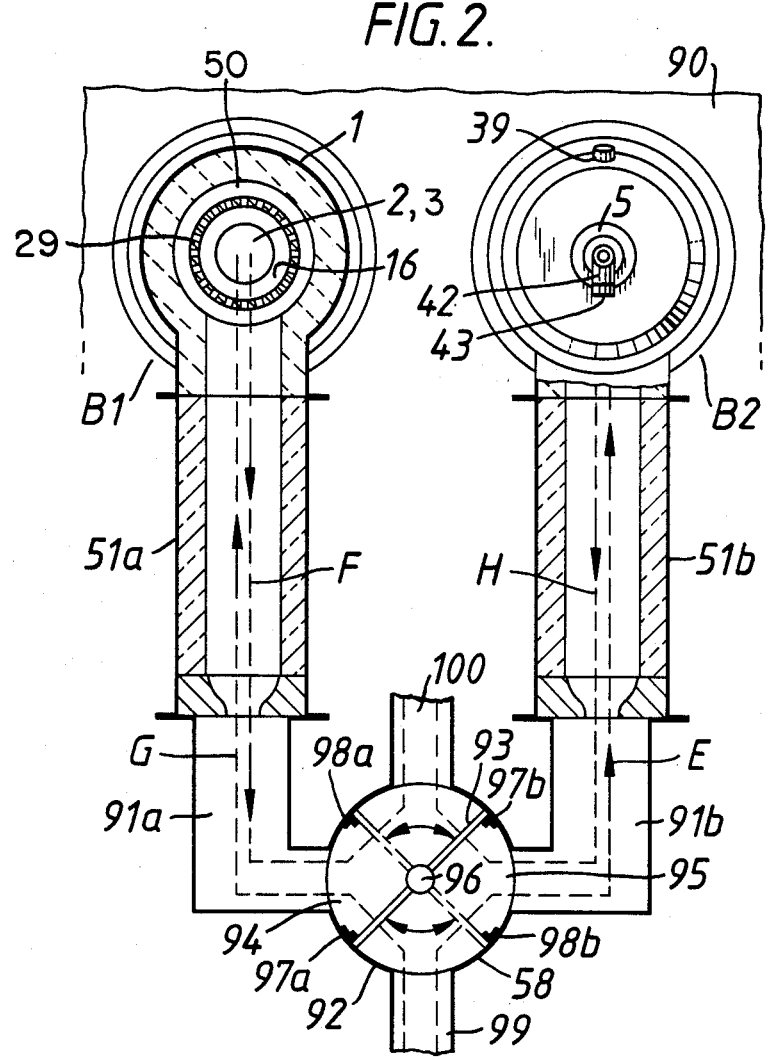

REGENERATIVE HEATING APPARATUS

This application is a continuation of application Ser. No. 588,712, filed Mar. 12, 1984, now abandoned.

The present invention relates to a regenerative heating system incorporating burners of the type which in one mode can serve as burners per se and in an alternate mode as flues for removing waste gas from a combustion space.

In a combustion system it may be necessary to exhaust the waste gas from a combustion space through the burner which may be heating the space (eg. a furnace). This could be where a regenerative system is used or where parts of the burners are used as flues. A typical arrangement is described in U.S. Pat. No. 4,522,588. In this case the burner acts cyclically as a burner for injecting combustion products into a furnace in one cycle or mode of operation and then as a flue for removing waste products from the furnace in an alternate cycle or mode of operation.

Safety requirements dictate that the burner should be prepurged with air and/or safely re-ignited on reversing its mode from a flue to a burner.

The present invention provides a regenerative heating system incorporating burners of the type described which are so designed that the need for prepurging with air or for re-igniting the burner is obviated.

According to the present invention, there is provided a regenerative heating apparatus comprising a pair of regenerators arranged so that in use while one is being heated by waste gas the other is preheating air for the combustion of fuel and reversing valve connected to one end of each regenerator and operable to connect one of the pair of regenerators to an outlet for discharge of the waste gas while simultaneously connecting the other regenerator to an inlet for receiving air for preheating in the other regenerator, the reversing valve being reversible to connect the one regenerator to the inlet and to connect the other regenerator to the outlet and each regenerator incorporating at its other end a burner with a body having a passage formed with a first opening which when the respective regenerator is preheating air serves to receive the air for combustion with fuel and which when the respective regenerator is being heated by waste gas serves to discharge the waste gas to the regenerator and a second opening which when the respective regenerator is being heated by waste gas serves to receive the waste gas for supply to the first opening and which when the respective regenerator is preheating air serves to discharge combustion products of fuel and air, the burner passage forming a combustion chamber for receiving fuel for combustion with preheating air when the respective regenerator is providing preheated air and each burner having means for directing towards the combustion chamber fuel which has at least been partially combusted within the burner body.

Embodiments of the invention will now be particularly described with reference to the drawings in which:

FIG. 2 is a schematic view of a regenerative heating apparatus incorporating two such burners, each on a reduced scale relative to FIG. 1, one shown in section along line 2—2 of FIG. 1 and the other shown in elevation.

Figure 1:
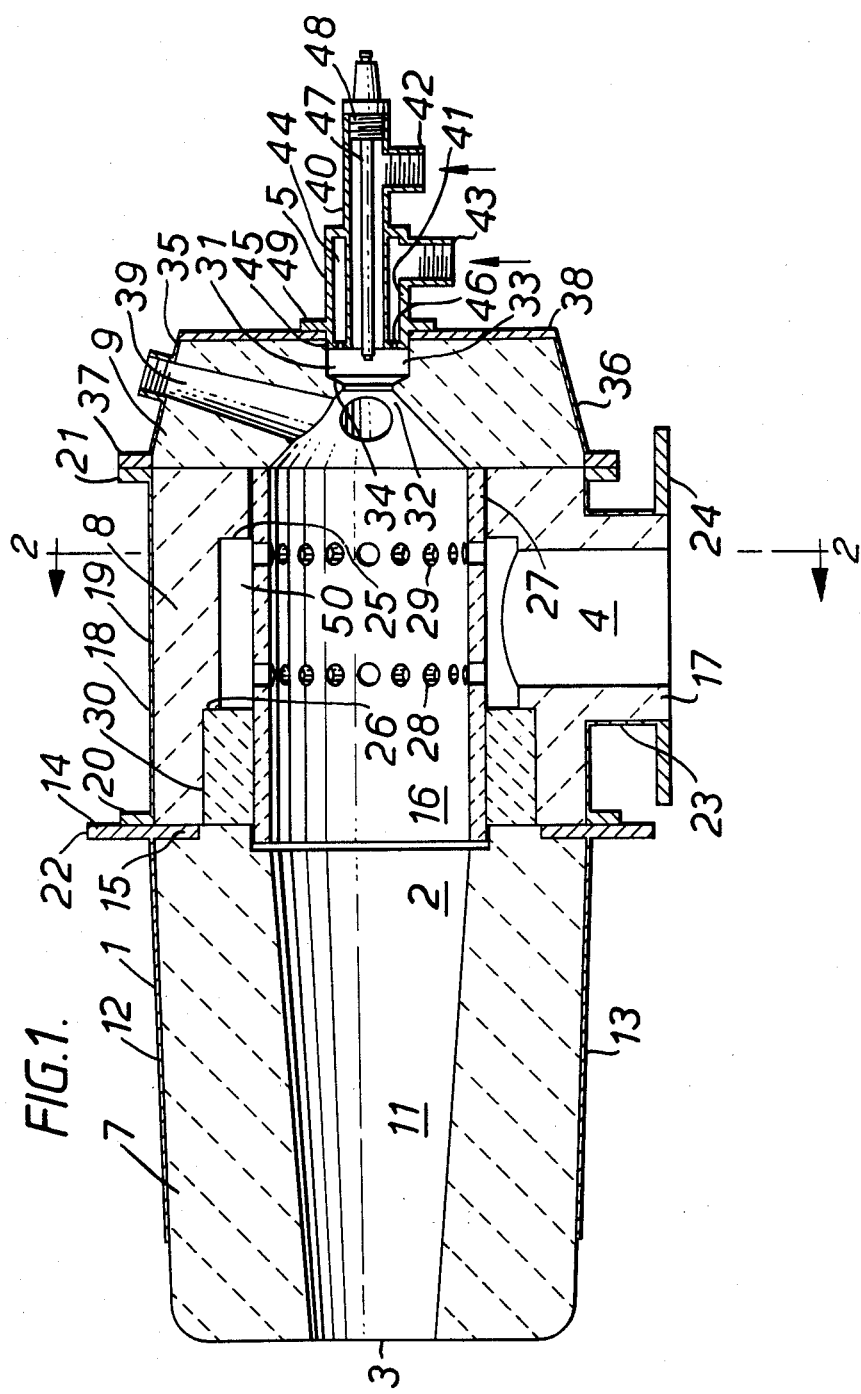
FIG. 1 shows a side view of a typical burner in section.

Referring to FIG. 1 the burner comprises a body 1 defining an axially extending passage 2 which provides in part between two openings 3 and 4 a flow path for fluid. An assembly 5 at the end of the passage 2 opposite the opening 3 is provided to supply a mixture of fuel and air to the passage 2.

The burner body 1 comprises a first portion 7 forming the opening 3, a second portion 8 adjacent the first portion 7 and in which the opening 4 is formed and a third portion 9 adjoining the second portion 8 and incorporating the fuel/air supply means 5.

Each of the portions 7, 8 and 9 is constructed of a heat insulating refractory material.

The first portion 7 is of generally frusto-conical shape tapering towards the opening 3 and forms a part 11 of the passage 2, the part 11 tapering inwardly towards the opening 3. A rearward section of the first portion 7 is housed in a metal housing 12 e.g. of steel. The housing 12 comprises a tapering section 13 which extends from the inner end of the portion 7 to terminate just behind the opening 3 and a flange 14 secured to the section 13. A radially inner part 15 of the flange 14 is located within a recess formed at the inner end of the portion 7.

The second portion 8 is generally cylindrical in shape and forms an intermediate part 16 of the passage 2. The portion 8 is provided with a stub pipe 17 located between its end, the pipe 17 forming the opening 4. The second portion 8 is housed in a metal housing 18 e.g. of steel.

The housing 18 has a generally cylindrical section 19 terminating at either end of the portion 8 in a radially outwardly extending flange 20 and 21. The flange 20 is secured to a radially outer part 22 of the flange 14. The housing 18 also comprises a cylindrical radial section 23 which encloses the stub pipe 17 and which is formed with a flange 24. The second portion 8 has an internal bore with two circumferential steps 25 and 26 so that the internal diameter of the portion 8 increases from left to right as viewed on the drawing.

Extending axially through the portion 8 is a cylindrical refractory can 27 which terminates at the left hand end within a recess formed in the first portion 7 and at the right hand end abuts against the inner face of the third portion 9.

The can 27 is provided with two parallel circumferential rows of fluid distribution holes 28 and 29 which communicate with the passage 2 and the opening 4.

A cylindrical refractory gasket 30 located between the inner end of the portion 7 and the step 26 serves as a seal to prevent fluid leaking between the can 27 and the second portion 8.

The third portion 9 is generally frusto-conical in shape and forms a third opening 31 into the passage 2. The third opening 31 provides a mixing nozzle for fuel and air which in use is injected by the assembly 5. The third portion 9 also forms a third part 32 of the passage 2, the part 32 communicating with the nozzle 31.

The nozzle 31 comprises a cylindrical end bore 33 leading into a convergent section 34. The convergent section 34 leads into the passage part 32 which tapers outwardly towards the passage part 16.

The third portion 9 is housed in a metal housing 35 e.g. of steel. The housing 35 comprises an outer sheath 36, which is flanged at its inner end 37 for connection to the flange 21 of the housing 18, and an end plate 38 for abutting the outer end of the third portion 9.

The third portion 9 is provided with a radially offset passage 39 having one end terminating in the passage part 32 and the other end in a viewing glass (not shown)

to enable combustion occuring in the passage part 32 to be examined.

The assembly 5 comprises a fuel duct 40 and an air duct 41 surrounding with clearance the front part of the fuel duct 40.

The fuel duct 40 is provided with an internally threaded radial inlet 42 for connection to a suitable fuel supply of for example natural gas.

The air duct 41 is provided with an internally threaded radial inlet 43. The air duct 41 forms with the outer wall of the fuel duct 40 a chamber 44 into which the air is injected. The chamber 44 has a front wall 45 formed as a flange 45 connecting the front end of the fuel duct 40 to the front end 41 of the air duct 41. The wall 45 has several circumferentially spaced ports 46 through which air can leave the chamber 44 to mix with fuel leaving the front end of the fuel duct 40 within the mixing nozzle 31.

Extending axially through the fuel duct 40 is a conventional ignition electrode 47 which terminates within the mixing nozzle 31. The electrode 47 forms a threaded connection 48 with the fuel duct 40.

The air duct 41 is formed with an external flange 49 to enable the assembly 5 to be secured to the end plate 38 with the front part of the assembly 5 projecting into the nozzle 31.

The pipe 17 serves either as an inlet for a supply of primary combustion air when the burner is serving as a burner per se in one mode or as an outlet for waste gas when the burner is serving as a flue in the alternate mode. The cylindrical can 27 forms with the second portion 8 an annular air chamber 50 for supplying the air to the passage 2 by way of the holes 28 and 29.

The opening 4 serves as an outlet for combustion products leaving the burner when the burner is serving as a flue in one mode or as an inlet for combustion air when the burner is serving as a burner in the alternative mode.

The passage part 32 provides a pre-combustion zone or chamber for the fuel/air mixture which is mixed and ignited in the nozzle 31. If the burner is serving in its normal burner mode the passage part 16 provides a primary combustion zone or chamber for the either partially or fully pre-combusted fuel which enters the passage part 16 from the part 32.

The pre-combusted fuel is then fully combusted by the primary air entering the chamber by way of the holes 28 and 29.

This construction of the burner provides a sheltered zone for pre-combustion of the fuel/air mixture within the zone 32 even when the burner is serving as a flue. Consequently where the burner is cycling between a firing and a flue mode there is no need to re-ignite the fuel or prepurge it with air between a fluing and firing cycle since combustion of the fuel can be maintained at all times. During the fluing cycle of course the fuel supply can be reduced to the level at which combustion is just maintained. This may be as low as 1.5% of the full fuel supply.

The primary combustion air can be suplied preheated from a regenerator or recuperator.

Each burner forms part of a conventional heat recovery system such as that shown in FIG. 2.

In this case the heat recovery system comprises a pair of such burners B1 and B2 and a pair of heat regenerators 51a and 51b, together with a conventional rotating reversing valve 58.

The burners B1 and B2 are mounted side by side on a furnace 90 so that their bores 2 communicate with the interior of the furnace 90.

The regenerator 51a is connected at one end to the burner B1 by the flange connections shown in FIG. 2. Similarly the regenerator 51b is connected at one end of the burner B2 by similar flange connections.

Each of the regenerators 51a and 51b are connected at their other ends to right angled ducts 91a and 91b by means of the flange connections shown in FIG. 2.

The rotary valve 58 comprises a cylindrical housing 92 (the axis of the cylinder extending into the plane of the paper) in which is located a vane 93 which extends axially through the cylinder and divides the housing 92 into two always separate but movable compartments 94 and 95 which are of semi-circular section. The vane 93 is mounted for rotation on a spindle 96 which extends through the housing 92. The vane 93 is rotatable between two positions at 90° to each other as shown in FIG. 5, one position being shown in full line and the other in broken line. The limits to rotation are fixed by two pairs of elongate seals 97a and 97b and 98a and 98b which are secured to the internal surface of the housing 92 with adjacent seals 90° apart.

The vane 93 and the seals 97 and 98 are such that when the vane 93 is engaging one pair of seals the two compartments so formed 10 are sealed from each other.

The ducts 91a and 91b lead respectively to the compartments 94 and 95 and are welded to the valve housing 92.

The housing 92 is also provided with an inlet duct 99 for receiving cold air for combustion and opposite to the duct 99 a hot waste gas outlet duct 100.

The valve 58 is so arranged that when the vane 93 is in one sealing position one duct 91 is connected to the air inlet duct 99 and the other duct 91 is connected to the waste gas outlet duct 100. In the other position when the vane 93 has rotated through an arc of 90° the connections are reversed.

In operation of the system, one of the burners is selected to provide hot gas for the furnace while the other burner serves simultaneously as a flue for discharging the hot waste gas to the regenerator system.

Thus if the burner B1 connected to the regenerator 51a is serving as a flue and the burner B2 connected to the regenerator 51b is providing combusted gas, valve 58 is positioned to connect the regenerator 51b to air inlet duct 99 and to connect the regenerator 51a to the hot waste gas outlet duct 100, the vane 93 being in the full line position of FIG. 5. In this mode cold combustion air enters the duct 99 and the regenerator 51b by way of the valve 58 and the duct 91b. The air then travels up through the regenerator 51b by way of the heat storage bed which will already be heated from previous heat recovery cycles. The now hot air then leaves the regenerator 51b and enters the burner B2 so as to mix with fuel gas entering the burner B2 to provide combusted hot gas for the furnace 90 (See arrows E).

Simultaneously hot waste gas leaves the furnace 90 after use by way of the other burner B1 which in this mode acts as a flue. The waste gas enters the regenerator 51a and travels downwardly through the regenerator 51a by way of the heat storage bed.

This bed is thereby heated by the waste gas and serves to store this heat for heating cold combustion air during the next heating cycle. The waste gas then leaves the regenerator 51a and enters the duct 91a before issuing from the outlet duct 100 by way of the valve 58 (see arrows F).

After some time, the heat stored in the regenerator 51b will be exhausted and/or the bed in regenerator 51a will have been heated up as much as is possible or desirable. At this stage therefore the heat cycle is reversed by rotating the valve vane 93 by 90° to the position shown in broken line in FIG. 2.

Cold combustion air now enters the burner B1 by way of the inlet duct 99, the valve 58, the duct 91a and the regenerator 51a (see arrows G) and is preheated for the combustion of fuel gas in the burner B1.

Waste gas meanwhile leaves the burner B2 and enters the regenerator 51b to heat the storage bed therein. The waste gas then leaves the regenerator 51b and passes through the duct 91b and the valve 58 before discharge to atmosphere via the outlet duct 100 (see arrows H).

We claim:

1. A regenerative heating apparatus comprising a pair of regenerators arranged so that in use while one is being heated by waste gas the other is preheating main combustion air for the combustion of fuel and a reversing valve connected to one end of each regenerator and operable to connect one of the pair of regenerators to an outlet for discharge of the waste gas while simultaneously connecting the other regenerator to an inlet for receiving the main combustion air for preheating in the other regenerator, the reversing valve being reversible to connect the one regenerator to the inlet and to connect the other regenerator to the outlet and each regenerator incorporating at its other end a burner with a body having a passage formed with a first opening which, when the respective regenerator is preheating main combustion air serves to receive the main combustin air for combustion with the fuel and which, when the respective regenerator is being heated by waste gas serves to discharge the waste gas to the regenerator, and a second opening which, when the respective regenerator is being heated by waste gas serves to receive the waste gas for supply to the first opening and which, when the respective regenerator is preheating main combustion air serves to discharge combustion products of fuel and air, the burner passage forming a combustion chamber for receiving fuel for combustion with the preheated main combustion air when the respective regenerator is providing preheated air and each burner having a mixing nozzle formed as a third opening in the passage for discharging a fuel-auxiliary air mixture into the combustion chamber, said mixing nozzle defining an upstream end, a fuel delivery port at said upstream end, and an auxiliary air delivery port at said upstream end, said mixing nozzle having a downstream end communicating with said combustion chamber, said mixing nozzle tapering inwardly over at least a portion of the distance between said upstream end and said downstream end, an ignition means in said mixing nozzle for igniting said fuel-auxiliary air mixture at least one of said delivery ports surrounding the other and coaxial with it, said ignition means extending through one of said ports, a precombustion zone between the mixing nozzle and the combustion chamber for precombustion of said fuel-auxiliary air mixture, means for supplying fuel to the nozzle fuel delivery port at a first rate during a combustion mode when the burner is receiving main combustion air and at a second rate during a discharge mode when the burner is discharging waste gas, the first rate being higher than the second rate, means for supplying an auxiliary supply of air to the nozzle auxiliary air delivery port at a rate sufficient to support the combustion of the fuel when supplied at the second rate, the precombustion zone being shaped to form a shelter means to assure that at least partial combustion of the fuel-auxiliary air mixture is maintained during the discharge mode.

2. Apparatus as claimed in claim 1 in which the first burner opening is located intermediate the second opening and the mixing nozzle.

3. Apparatus as claimed in claim 1 in which the first opening includes means for transferring fluid to the passage as a plurality of streams.

* * * * *